United States Patent [19]

Fuller, Jr. et al.

[11] Patent Number: 5,048,695
[45] Date of Patent: Sep. 17, 1991

[54] REJECT STATION IN A GRAVITY CONVEYOR

[75] Inventors: Robert L. Fuller, Jr., Issaquah; Paul E. Faville; Mark C. Maier, both of Renton, all of Wash.

[73] Assignee: The Boeing Company, Seattle, Wash.

[21] Appl. No.: 652,301

[22] Filed: Feb. 5, 1991

Related U.S. Application Data

[60] Continuation of Ser. No. 469,138, Jan. 24, 1990, abandoned, which is a division of Ser. No. 270,251, Nov. 10, 1988, abandoned.

[51] Int. Cl.⁵ ............................................. B07C 5/36
[52] U.S. Cl. .................................. 209/552; 193/31 R; 198/360; 209/655; 209/698; 209/911; 209/924; 209/933
[58] Field of Search ............... 209/539, 552, 576, 598, 209/655, 698, 924, 933, 911, 939, 707; 193/13, 14, 31 R; 198/360, 398

[56] References Cited

U.S. PATENT DOCUMENTS

| | | | |
|---|---|---|---|
| 3,348,678 | 10/1967 | Flowers | 209/698 X |
| 3,355,014 | 11/1967 | Howles | 209/698 X |
| 3,631,979 | 1/1972 | Frankiewicz | 209/655 X |
| 4,016,072 | 4/1977 | Cavenar | 209/698 X |
| 4,228,901 | 10/1980 | Watzka et al. | 209/911 X |
| 4,624,369 | 11/1986 | Okada | 209/698 X |
| 4,765,484 | 8/1988 | Klumparendt | 209/576 X |
| 4,804,078 | 2/1989 | Scata | 209/655 X |
| 4,823,930 | 4/1989 | Löw | 198/360 X |

FOREIGN PATENT DOCUMENTS

596943  5/1975  Switzerland .................... 209/598

Primary Examiner—Donald T. Hajec
Attorney, Agent, or Firm—Delbert J. Barnard

[57] ABSTRACT

A first rotatable conveyor section (16) is positioned axially between upper and lower fixed sections (14,18) of a gravity conveyor. Rotatable conveyor section (16) rotates about an axis extending perpendicular to the conveyor section. A gate (42,44) is provided at each end of the rotatable conveyor section (16). An identification device (84) is positioned upstream of the rotatable conveyor section (16). It identifies the end-to-end orientation of an article (10) which is travelling along the gravity conveyor (12). A computer controls the gates (42,44) and a mechanism (104) for rotating the rotatable conveyor section (16). When an article (10) having an improper end-to-end orientation is encountered, the rotatable conveyor section (16) is rotated 180° for the purpose of reversing the article's orientation. A second rotatable conveyor section (120) is mounted for sideways rotation about an axis which extends longitudinally of the slide conveyor (12). When the identification device (84) identifies the presence of an article (10) which is either too small or too big or for some other reason is not to be further processed in the system, or if a plurality of articles are detected to be travelling together, the conveyor section (120) is rotated sideways to dump the article or articles into a collection pan (140,142) which directs the article or articles into a collection receptacle (144,146).

5 Claims, 7 Drawing Sheets

REJECT STATION IN A GRAVITY CONVEYOR

This is a continuation of copending application Ser. No. 07/469,138 filed on Jan. 24, 1990, which in turn is a division of Ser. No. 07/270,251, filed Nov. 10, 1988 both now abandoned.

TECHNICAL FIELD

This invention relates to automated handling of a large number of relatively small articles (e.g. drill bits). More particularly, it relates to a mechanism for discharging from a gravity conveyor articles which are oversized, undersized or otherwise improper for subsequent handling.

BACKGROUND OF THE INVENTION

Many manufacturing operations (e.g. the manufacture of aircraft) require the drilling of a large number of holes in varying sizes. Drill bits are used until they become dull and then they are resharpened. In a typical aircraft manufacturing plant, it is necessary to resharpen an extremely large number of drill bits each week. By way of example, approximately fifty thousand drill bits are resharpened each week by The Boeing Company in a facility in Auburn, Wash.

The used drill bits are cleaned and sorted before being resharpened. In the past, the sorting operation has been a manual process requiring a number of people (e.g. eight) to perform rough sorting and final sorting activities. In the manual process, cleaned drill bits are deposited onto a conveyor which moves past two or three people who manually remove the drill bits from the conveyor and separate them into rough sort categories (e.g. twenty to twenty-five categories). The drill bits are then hand carried to final sort areas where additional personnel (e.g. five to six people) manually identify and place the drill bits into species bins. In the aforementioned Auburn facility of The Boeing Company, the drill bits to be sorted comprise over six hundred types or species.

The principal object of the present invention is to provide an apparatus and method for reversing the end-to-end orientation of an elongated article, such as a drill bit, as it is moving along a gravity conveyor from one station to the next, in a system for automatically sorting or otherwise handling the articles. Another object is to provide an apparatus and method for removing from the gravity conveyor articles which are outside of a predetermined size range and multiple drills which are together.

RELATED APPLICATIONS

The apparatus of the present invention may be a part of an automated article sorting system which receives the articles in bulk, sometimes entangled, and automatically separates them and starts them on a path of travel in single file. By way of example, the articles can be separated and moved onto a conveyor, in a single file, by use of a singulating system which forms the subject matter of a co-pending companion application Ser. No. 270,130, filed Nov. 10, 1988, and entitled, "Article Singulating System and Method."

Following orientation, the articles to be sorted may be moved past an article identification device, e.g. an optical micrometer, which identifies the articles as to type or species and produces an identification signal that is used for automatically placing the articles into receiving bins or receptacles. This sorting can be accomplished by use of a method and system of a type forming the subject matter of a second co-pending companion application Ser. No. 270,221, filed Nov. 10, 1988, and entitled, "Article Sorting Apparatus and Method."

It is desirable that the receiving bins or receptacles into which the sorted articles are placed be located close together in an area involving a relatively small amount of floor space. This can be accomplished by positioning the receiving bins side by side along a helical path. A receiving bin system of this type forms the subject matter of a third copending companion application, Ser. No. 269,991, filed Nov. 10, 1988, and entitled "Storage Mechanism for Sorted Articles."

An overall system for handling and sorting drill bits forms the subject matter of a fourth copending application, Ser. No. 270,129, filed Nov. 10, 1988, and entitled, "Automated Drill Sorting System and Method."

DISCLOSURE OF THE INVENTION

According to an aspect of the invention, a rotatable conveyor section is positioned to be in series between a fixed position lead-in conveyor section and a fixed position lead-out conveyor section. The rotatable conveyor section is mounted for rotation about an up-and-down extending axis. It includes a longitudinal slideway along which an article may slide, and a closure gate at each of its ends. Each closure gate has an open position and a closed position. The lead-in conveyor section includes a slideway for delivering an article to the slideway of the rotatable conveyor section. The lead-out conveyor section includes a slideway for receiving an article from the slideway of the rotating conveyor section and conveying it away from the rotating conveyor section. The lead-in conveyor section, the rotatable conveyor section, and the lead-out conveyor section are normally positioned with their slideways in linear alignment with each other. A drive is provided for rotating the rotatable conveyor section 180° in position.

According to an aspect of the invention, an identification device is associated with the lead-in conveyor section, for identifying the end-to-end orientation of an article as it moves along such conveyor section toward the rotatable conveyor section. A control means is provided which is responsive to a particular end-to-end orientation of an article for operating the drive to rotate the rotatable conveyor section 180° after the identified article has entered the rotatable conveyor section.

In preferred form, the lead-in conveyor section, the rotatable conveyor section and the lead-out conveyor section slope downwardly from the lead-in conveyor section to the lead-out conveyor section, and the articles move downwardly along the slideways by gravity.

In preferred form, the closure gate at the upper end of the rotatable conveyor section has an open position permitting movement of an article from the slideway of the lead-in conveyor section onto the slideway of the rotatable conveyor section. The closure gate at the lower end of the rotatable conveyor section has a closed position in which it is located within the slideway and blocks further movement of the article along the slideway.

According to an aspect of the invention, position sensors are provided for determining which end of the rotatable conveyor section is up and which is down, and generating a signal indicative of the particular end-to-end position of the rotatable conveyor section. This signal may be used as an input to a computer control which opens and closes the closure gates.

In preferred form, the rotatable conveyor section includes an elongated body and the longitudinal slideway of such section is incorporated in said body. The body is mounted for rotation about said up-and-down extending axis. The body carries an abutment adjacent one of its ends. The sensor means comprises a pair of movable elements mounted adjacent the opposite ends of the rotatable conveyor section, each offset from the path of rotation of the body, but each in a position to be contacted and moved by the abutment. Abutment contact and movement of the element that is at the abutment end of the rotatable conveyor section produces a signal indicative of the end-to-end position of the rotatable conveyor section.

According to an aspect of the invention, various stop gates and position sensors are spaced along the conveyor. The position sensors are used to send signals to the computer, for controlling the sequence and timing of the opening and closing of the various gates. In general, an upstream gate will not open and allow downward movement of the article until the next component of the system downstream of the gate is ready to receive the article.

Yet another aspect of the invention is the provision of a reject station in the gravity conveyor which is adapted to roll sideways about an axis extending longitudinally of the conveyor, to in that manner dump from the conveyor articles which are oversized, undersized or otherwise improper for subsequent handling.

Other objects, features and advantages of the invention are hereinafter described in detail as a part of the description of the best mode.

BRIEF DESCRIPTION OF THE DRAWINGS

Like reference numerals or letters are used to designate like parts throughout the several views of the drawing, and.

BEST MODE FOR CARRYING OUT THE INVENTION

Figure 1:
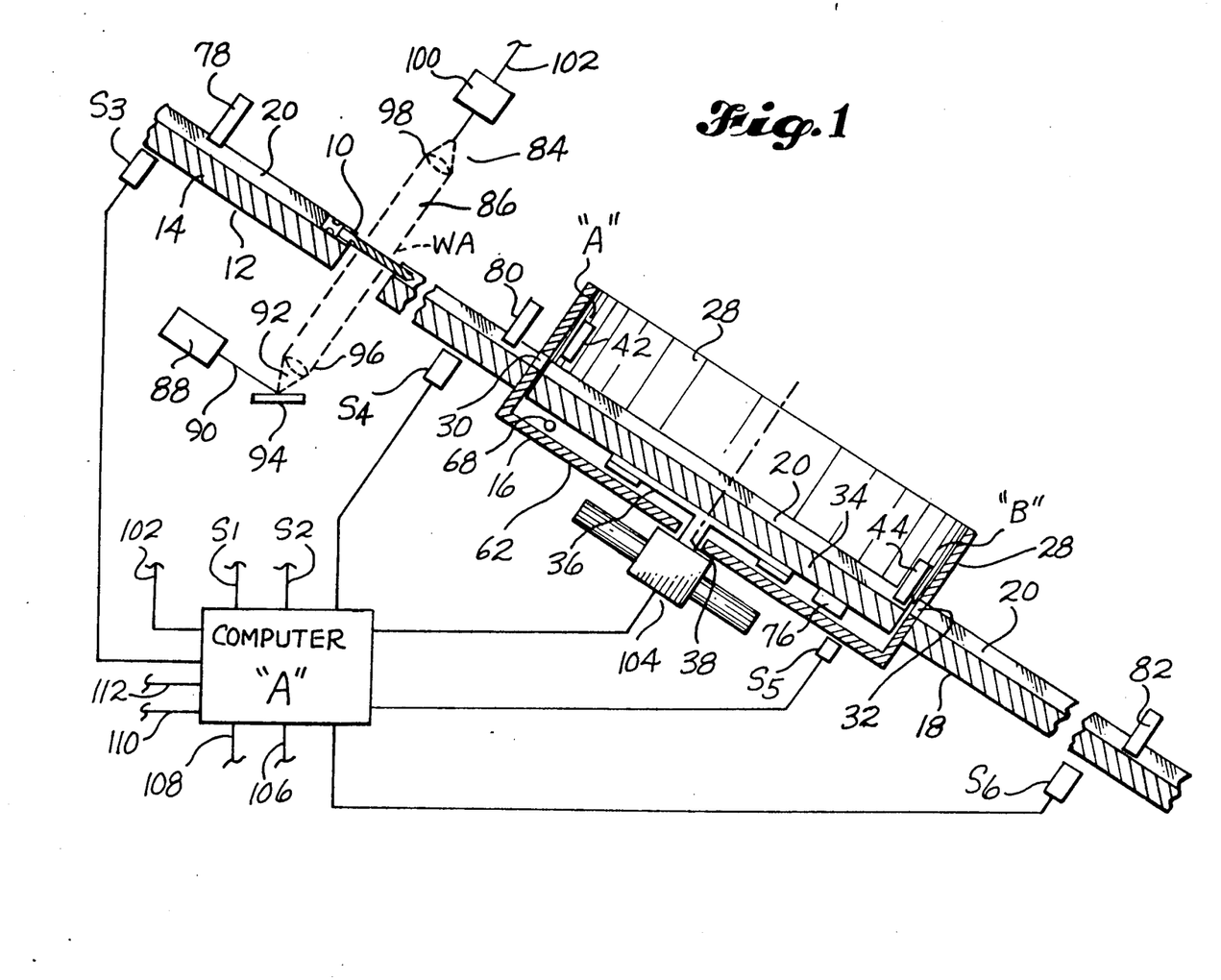
FIG. 1 is a simplified schematic diagram of the article orientation system of the invention, such view showing fixed and rotatable sections of a gravity conveyor in longitudinal section, and showing a relative positioning of the rotatable section to an optical micrometer and various gates and sensors which are a part of the system.
Figures 2, 3, 4, 5:
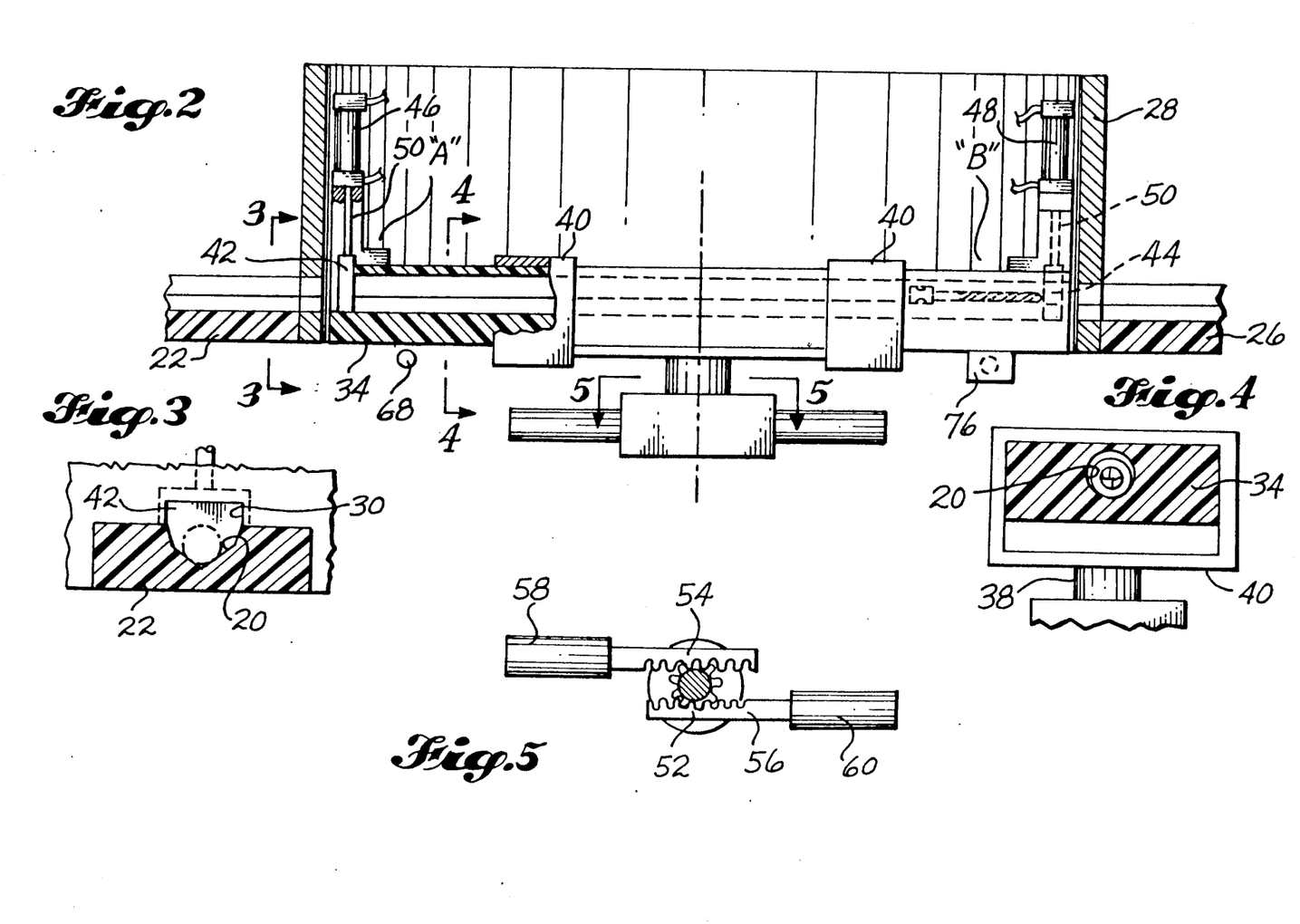
FIG. 2 is a longitudinal sectional view of an embodiment of the rotatable conveyor section, with some parts shown in elevation, such view showing the two ends "A" and "B" of the rotatable section in the same orientation as they appear in FIG. 1.
FIG. 3 is a cross-sectional view taken substantially along line 3—3 of FIG. 2.
FIG. 4 is a cross-sectional view taken substantially along line 4—4 of FIG. 2.
FIG. 5 is a cross-sectional view taken substantially along line 5—5 of FIG. 2.

Referring to FIG. 1, an article 10, shown in the form of a drill bit, having a pointed front end and a rear end adapted to be received in a power drill, is shown in the process of sliding down a gravity conveyor 12. The portion of the gravity conveyor 12 that is illustrated comprises an upper lead-in section 14, a rotatable intermediate section 16 and a lower lead-out section 18. Each conveyor section 14, 16, 18 includes a section of a slideway 20, which may be of channel form, and in which and along which the article 10 slides. FIGS. 3 and 4 show an example configuration of the channel 20. In each conveyor section 14, 16, 18, the channel 20 may be formed in an elongated member 22, 34, 26 which is constructed from a self-lubricating plastic material, to cut down friction between the article 10 and the surfaces of the slideway 20 which are contacted by it.

As shown in FIG. 1, the conveyor sections 14, 16, 18 are in colinear alignment, and they slope downwardly from the upper section 14 down to the lower section 18. The slope of the conveyor 14, 16, 18 is such that any article 10 placed in the slideway 20 will freely slide down the slideway 20, under the influence of gravity alone.

The system illustrated by FIG. 1 was developed to be a part of a "no hands" system (i.e. a mechanized system) for sorting drill bits. In such system it is usually important that all of the drill bits move with a common end forward throughout a portion of the system which is downstream of the rotatable conveyor section 16. Reference is made to the aforementioned copending application Ser. No. 270,221, entitled, "Article Sorting Apparatus and Method", and to copending application Ser. No. 270,129, entitled "Automated Drill Sorting System and Method," and to copending application Ser. No. 316,171, entitled "Material Composition Analyzer and Method", for a discussion of the reasons for putting drill bits into an orientation with a common end leading. It is believed that the system of this invention also has utility aside from the specific systems discussed in such copending applications.

Figure 6:
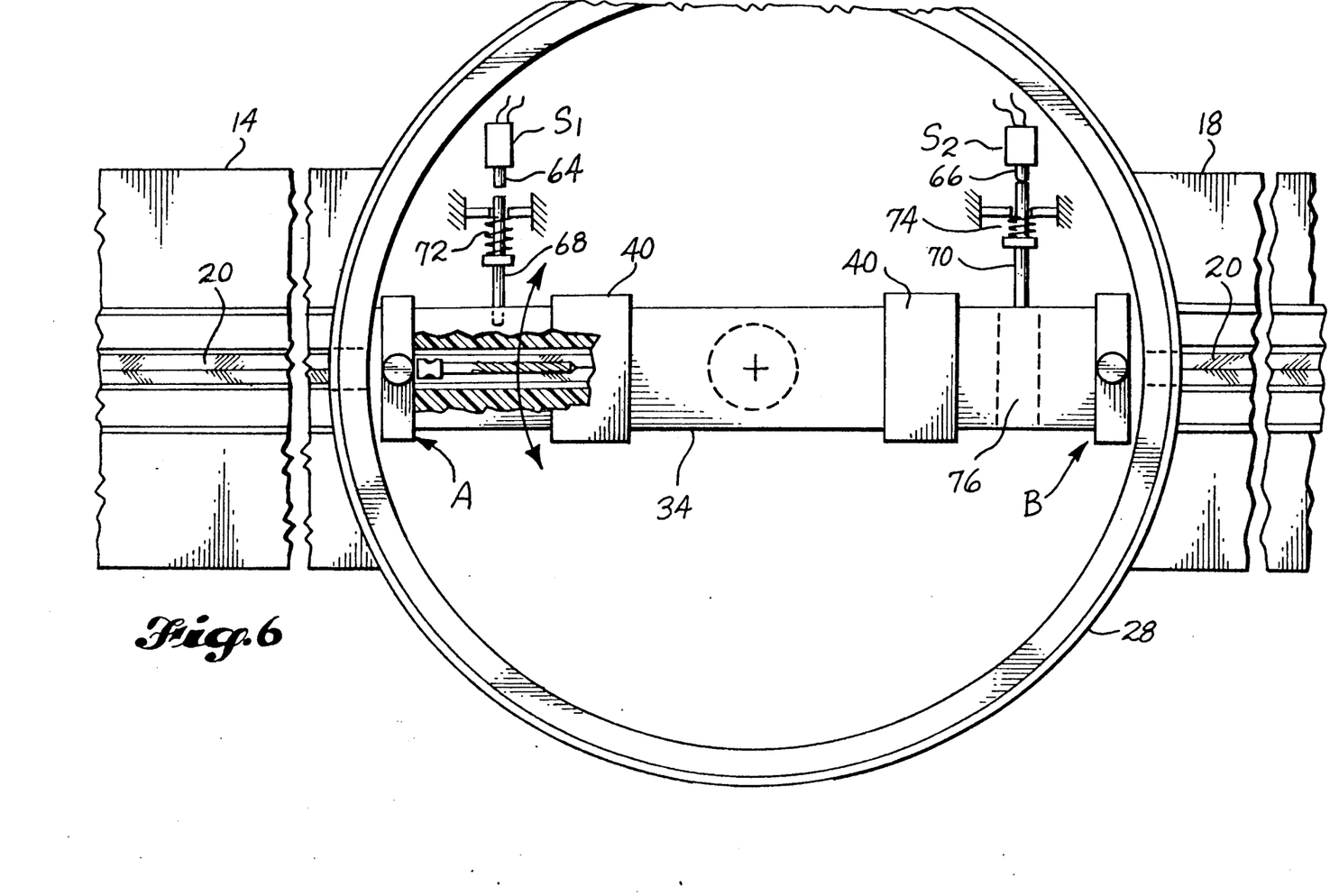
FIG. 6 is a top plan view of the rotatable conveyor section, with some parts omitted and others shown in section, and still others shown schematically, such view showing the ends "A" and "B" of the rotatable section in the same orientation as they appear in FIGS. 1 and 2.
Figure 7:
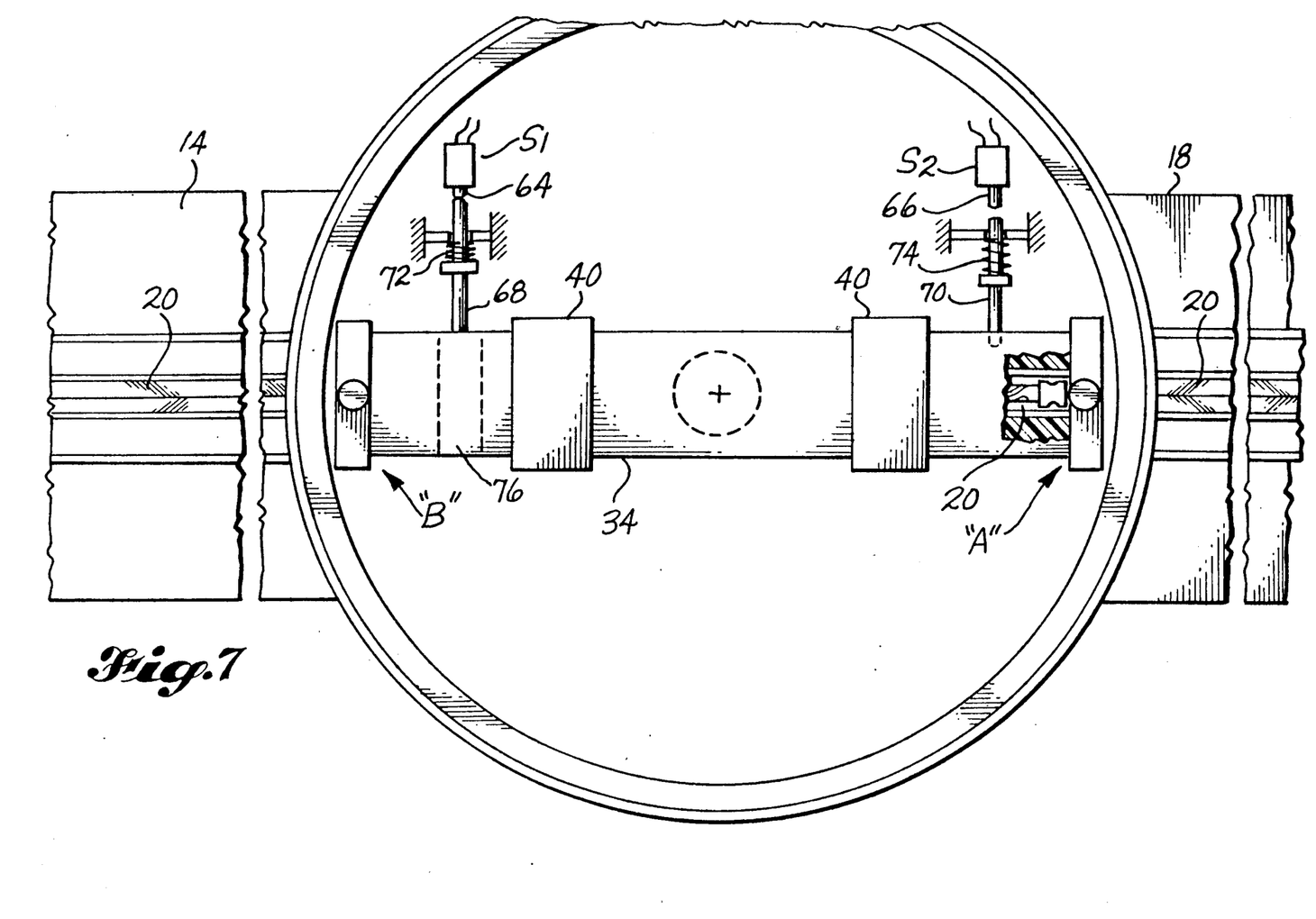
FIG. 7 is a view like FIG. 6, but showing the ends "A" and "B" of the rotatable section turned 180° from the position shown in FIG. 6.

Referring to FIGS. 1, 6 and 7, the rotatable conveyor section 16 may be positioned within a cylindrical housing 28 which is fixed in position and includes tunnel openings 30, 32 in its sidewall in alignment with the slideway 20. FIG. 3 shows the shape of opening 30. Opening 32 has the same shape and so it has not been separately illustrated.

Housing 28 is either open at its top or provided with a removable lid (not shown). The rotatable conveyor section 16 includes a body 34 which, as previously stated, is preferably constructed from a self-lubricating plastic material. The body 34 may be connected to a central hub structure 36 which is in turn connected to a shaft 38. In FIG. 1, the slideway 20 in rotatable section 16 is shown open at its top. However, in preferred form, the slideway 20, where it extends through the rotatable conveyor section 16, is closed at its top (FIG. 4). By way of example, connector hoops 40 may extend about both the body 34 and the hub structure 36, for connecting the body 34 to the hub structure 36 (FIGS. 2, 4, 6 and 7).

As shown by FIGS. 2, 6 and 7, a closure gate is provided at each end of the rotatable conveyor section 16. One end of the conveyor section 16 is designated "A". The gate at that end is designated 42. The opposite end of conveyor section 16 is designated "B". The gate at end "B" is designated 44. In preferred form, gate 42 is moved up and down by an air cylinder 46. Gate 44 is moved up and down by a second air cylinder 48. The gates 42, 44 are connected to their respective air cylinders 46, 48 by piston rods 50. The gates 42, 44 are shaped to fit into the slideway 20, when the piston rods 50 are extended. When the piston rods 50 are retracted, the gates 42, 44 are spaced upwardly above the slideway 20 a sufficient distance to allow passage of the articles 10 along the slideway 10, unimpeded by the gates 42, 44.

As shown by FIGS. 2, 6 and 7, the air cylinders 46, 48 are mounted onto end portions of the body 34, and are fixed in position relative to the body 34, and they rotate with the body 34.

FIG. 5 is a schematic showing of a drive that is provided for rotating the rotatable conveyor section 16 180°. A pinion gear 52 is secured to the shaft 38. A first rack 54 is connected to one side of the pinion gear 52. A second rack 56 is connected to the opposite side, in the manner illustrated. Rack 54 is reciprocated by an air motor 58 and rack 56 is reciprocated by an air motor 60. Extension of the two racks 54, 56 causes rotation of shaft 52, and conveyor section 16, in a first direction. Retraction of the racks 54, 56 causes a reverse rotation.

Housing 28 may include a bottom wall 62 spaced below the bottom surface of body 34. As shown by FIGS. 6 and 7, a pair of position sensors $S_1$, $S_2$ may be mounted on the bottom wall 62. The sensors $S_1$, $S_2$ are shown to include plungers 64, 66 which are directed essentially perpendicular to the body 34. Plunger 64 is in axial alignment with a pushrod 68. A second pushrod 70 is in axial alignment with plunger 66. As shown in FIGS. 6 and 7, the rods 68, 70 are normally spring biased away from the plungers 64, 66. The plunger 64 and pushrod 68 at the upstream end of the housing 28, and the plunger 66 and pushrod 70 at the lower end of the housing 28 are located below the rotational path of the body 34. However, body 34 includes a depending abutment 76 at one of the ends which is positioned to make contact with, and depress a pushrod 68, 70 in its path. Thus, when the rotatable body 34 is in the position shown by FIG. 6, the abutment 76 makes contact with and depresses pushrod 70. Specifically, it pushes pushrod 70 into a depressing engagement with plunger 66. At the opposite end of the rotatable body 34, the pushrod 68 is untouched by the rotatable body 38. However, when the rotatable body 34 has been rotated 180°, as shown by FIG. 7, the abutment 76 is moved over into depressing contact with the pushrod 68. Pushrod 70 is then free of contact with the rotatable body 34. As a result, plunger 66 is no longer depressed, but pushrod 68 has depressed plunger 64. The two sensors $S_1$, $S_2$ and the abutment 76 are used to provide a signal to be sent to the computer "A", so that the computer "A" will know which of the ends "A" and "B" is up and which is down.

Referring back to FIG. 1, the system may also include position sensors $S_3$, $S_4$, $S_5$, and $S_6$. The function of sensor $S_3$ is to detect the presence or absence of an article 10 against a gate 78. Sensor $S_4$ determines the presence or absence of an article 10 against gate 80. Sensor $S_5$ determines the presence or absence of an article 10 against gate 44. Sensor $S_6$ determines the presence or absence of an article 10 against gate 82.

Gates 42 and 44 have been described. Gates 78, 80, 82 may be in the form of swing arms which are swung up and down by rotary solenoids, such as disclosed in detail in the aforementioned copending application Ser. No. 270,221, entitled "Article Sorting Apparatus and Method." When a gate 78, 80, 82 is in its "down" position, the swing arm is located within the slideway 20, in a position to block sliding movement of an article 10 along the slideway 20. When a gate 78, 80, 82 is in its "up" or retracted position, it is spaced above the slideway 20 a sufficient amount to allow an article 10 to slide under it.

Referring again to FIG. 1, an optical micrometer 84 is shown positioned to provide a scanner beam 86 which extends across the slideway 20 in the infeed section 14 of the conveyor 12. By way of typical and therefore nonlimitive example, the optical micrometer 84 may be of a type manufactured by Techmet Company of 6060 Executive Boulevard, Dayton, Ohio 45424, and sold under the name LASERMIKE TM. This particular optical micrometer 84 includes a low power helium-neon laser 88 which provides a very narrow and parallel laser beam 90, approximately 0.25 mm. (0.01 inches) in diameter. This beam 90 is converted into a radially scanned beam 92 by a motor-driven multi-sided rotated mirror 94. The radially scanned beam 92 is converted into parallel scanning beam 86 by means of a scan lens set 96, 98 oriented such that its focal point coincides with the center of the rotating motor-driven mirror 94. The lens set 96, 98 is designed so that the parallel scanning beam 86 has a constant scanning velocity as it sweeps across the working area of the instrument. This scanning beam 86 provides a basis for making a no-contact measurement.

A drill bit or other article 10 is placed in the working area WA of the scanner beam 86 for a period of time proportional to the object profile along the scan path. The interrupted beam is collected by the receiving lens 98 and is focused onto a photodetector 100 which converts the collected light to a time dependent signal. This time dependent signal is sent via connection 102 to the computer "A". The purpose of the scanner beam 86, in the system of this invention, is to identify enough of the shape of the article 10 to provide determination of which end of the article is leading and which end is trailing, multiple drills, and drills outside diameter and length limits. This information is delivered to the computer "A" via the connection 102. Signals generated by the sensors $S_1$, $S_2$, $S_3$, $S_4$, $S_5$, $S_6$ are also delivered to the computer "A". The computer output includes a connection to the drive 104 for drive shaft 38. The computer "A" also sends out a control signal via path 106 to the air supply for the air cylinders 46, 48. Paths 108, 110, 112 send control signals to the solenoids which operate the gates 78, 80, 82.

In operation of the system, the computer "A" will not raise the gate 78 for the purpose of allowing an article 10 to slide down the slideway 20 until it receives input signals informing it that downstream of gate 78 the system is ready to receive the next article 10. When this signal is received, gate 78 is raised and the next article 10 is allowed to slide down the slideway 20. In FIG. 1, an article 10 is shown positioned in the working area WA, and in the process of being measured by the scanner beam 86. The laser scanner transmits diameters diameter measurements, etc., to the computer, which analyzes the data to determine drill identity. Article 10 then continues down slideway 20 until it contacts gate 80. Gate 80 will not be opened until the various signals received by computer "A" tell it that downstream of gate 80, the system is ready to receive another article 10. When this condition happens, the gate 80 is raised to allow the article 10 to slide through opening 30 into the rotatable conveyor section 16. At this time, gate 42 will be in an "up" position. If the end-to-end orientation of article 10 is proper, gate 42 will remain in an "up" position. If the orientation is not proper, after article 10 has slid down into a position against gate 44, and its presence there is sensed by the sensor S5, gate 42 will be closed ans a drive signal will be sent by the computer to the drive 104, causing it to rotate the rotatable body 38 180°. In the process, the end-to-end orientation of the article 10 will be reversed. Also, the article 10 will slide down into contact with gate 42 which now assumes the lower position. The presence of the article 10 against the gate 42, and a signal received from sensors $S_1$, $S_2$ to the effect that the body 34 has been rotated, will instruct the computer "A" to lift gate 42 and allow the article 10 to slide down into a position against gate 82. Any article 10 entering the rotatable conveyor section 16 will encounter a downstream gate (gate 44 in FIG. 1) which is in a "down" position. If the end-to-end orientation of the article 10 is proper, the downstream gate will stay closed until the preceding article 10 has moved past gate 82. If the orientation is not proper, the article 10 will move against the downstream gate and the rotatable conveyor section 16 will be rotated 180°. to reverse the end-to-end rotation of the article 10, and reverse the position of the two gates 42,44. The new downstream gate will stay closed until the preceding article 10 has moved past the gate 82, providing a space at gate 82 for another article 10. More specifically, if an article 10 moves against a downstream gate 42 or 44, with the wrong end leading, this condition is detected when the article 10 moves through the scanning beam 86. This sends a signal to the computer informing the computer that the conveyor section 16 needs to be rotated. The computer determines this by analyzing diameter data received from the laser scanner. The computer will respond by commanding the drive 104 to rotate the rotatable conveyor section 180°, reversing the end-to-end orientation of the article 10. The article 10 will than slide down into contact with the gate 42 or 44 which has been repositioned to become the lower gate. The presence of the article 10 against this gate 42 or 44, detected by sensor S5, and a signal received from sensors $S_1$, $S_2$ to the effect that the conveyor section has been rotated, will instruct the computer "A" to lift the new downstream gate 42 or 44 and allow the article 10 to slide down into a position against gate 82. The rotatable conveyor section 16 remains in its new position, with the gate that was previously the upstream gate now being the downstream gate and vice versa. Then, when the next article 10 comes along with an improper end-to-end orientation, its orientation can be reversed by a reverse rotation of the rotatable conveyor section 16, 180° back to the original position.

Figure 10:
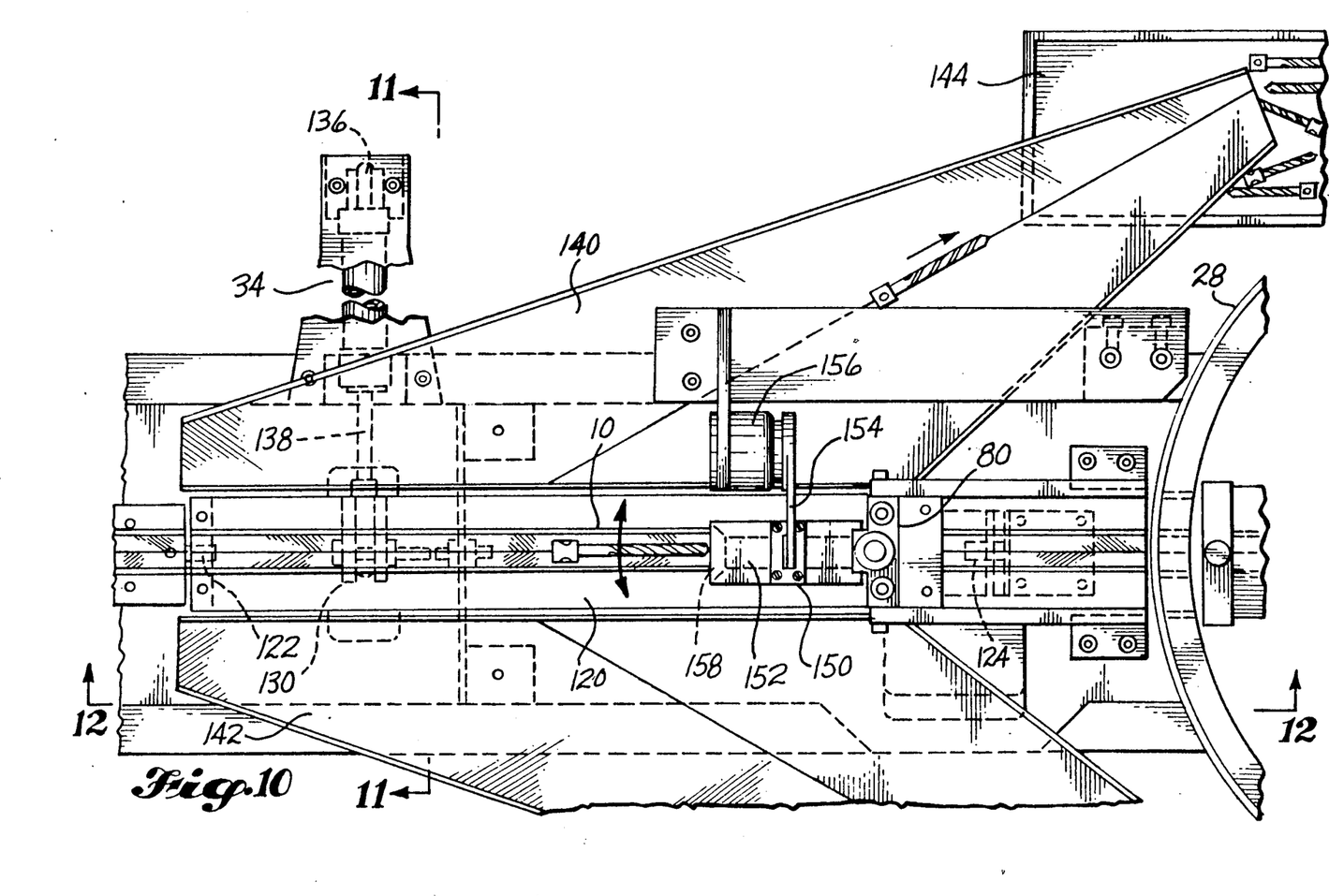
FIG. 10 is a fragmentary top plan view of a mechanism which may be positioned between the identification device and the rotatable conveyor section, for diverting into collection containers any article which is outside the permissible size limits of the system and plural articles travelling together.
Figures 11, 12:
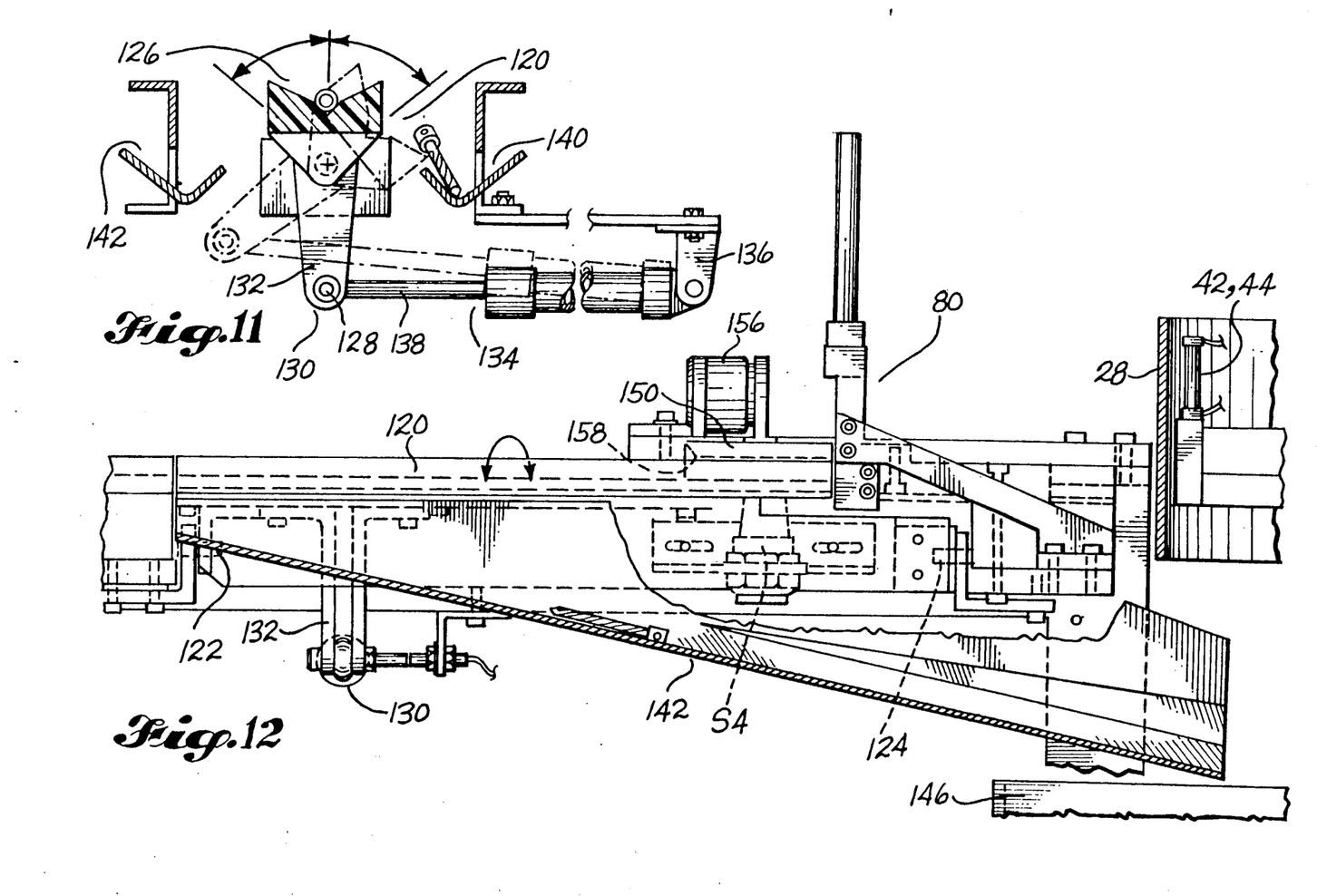
FIG. 11 is a sectional view taken substantially along line 11—11 of FIG. 10.
FIG. 12 is a sectional view taken substantially along line 12—12 of FIG. 10.

Referring to FIGS. 10–12, the sytem may be provided with a mechanism for rejecting articles 10 for which no receiving receptacle has been provided, such as, for example, articles 10 which are too large or too small, and/or for rejecting plural articles which are travelling together. These conditions can all be sensed by the identification device which then produces a control signal for operating the reject mechanism.

As shown by FIGS. 10–12, the reject mechanism may comprise a conveyor section 120 which is mounted to be rolled in position, to one side or the other. This may be simply done by providing the conveyor section 120 with coaxial pivot pin openings at its ends into with stationary pivot pins 122,124 project (FIG. 12). The common axes of the pivot pins lie in a vertical plane with the value line of the slideway channel 126 formed in the upper portion of the conveyor section 120 ad the axis 128 of a knuckle joint 130 at the lower end of an arm 132 which extends downwardly from an intermediate portion of the conveyor section 120. As shown by FIG. 11, one end of a fluid actuator 134 is connected by the knuckle joint 130 to the arm 132. The opposite end of the fluid actuator 134 is anchored in position by connection to a frame 136. Extension of the piston rod 138 will push the arm 132, rotating the conveyor section 120 towards a receiving pan 140. Retraction of the piston rod 138 will pull on the arm 132 and rotate the conveyor section 120 in the opposite direction, towards a second receiving pan 142. As best shown by FIG. 10, each receiving pan 140,142 is elongated and slopes downwardly from one end to the other. In FIG. 12, the conveyor section 120 is shown in a horizontal position but in reality it slopes from left to right, the degree of slope being shown in FIG. 1. Articles 10 deposited into chute 140 slide along the chute 140 and fall into a collection receptacle 144. In similar fashion, articles 10 dropped into chute 142 slide along chute 142 and drop into a collection receptacle 146. One of the collection receptacles 144,146 may be for receiving oversized and/or undersized articles 10. The other may be for receiving plural articles travelling together.

The slideway channel 126 in conveyor section 120 is aligned with the slideway channel 20 in the slide conveyor 12. Thus, when conveyor section 120 is in an upright position, as shown in FIG. 11, it is a functional part of the slide conveyor 12.

Figures 8, 9:
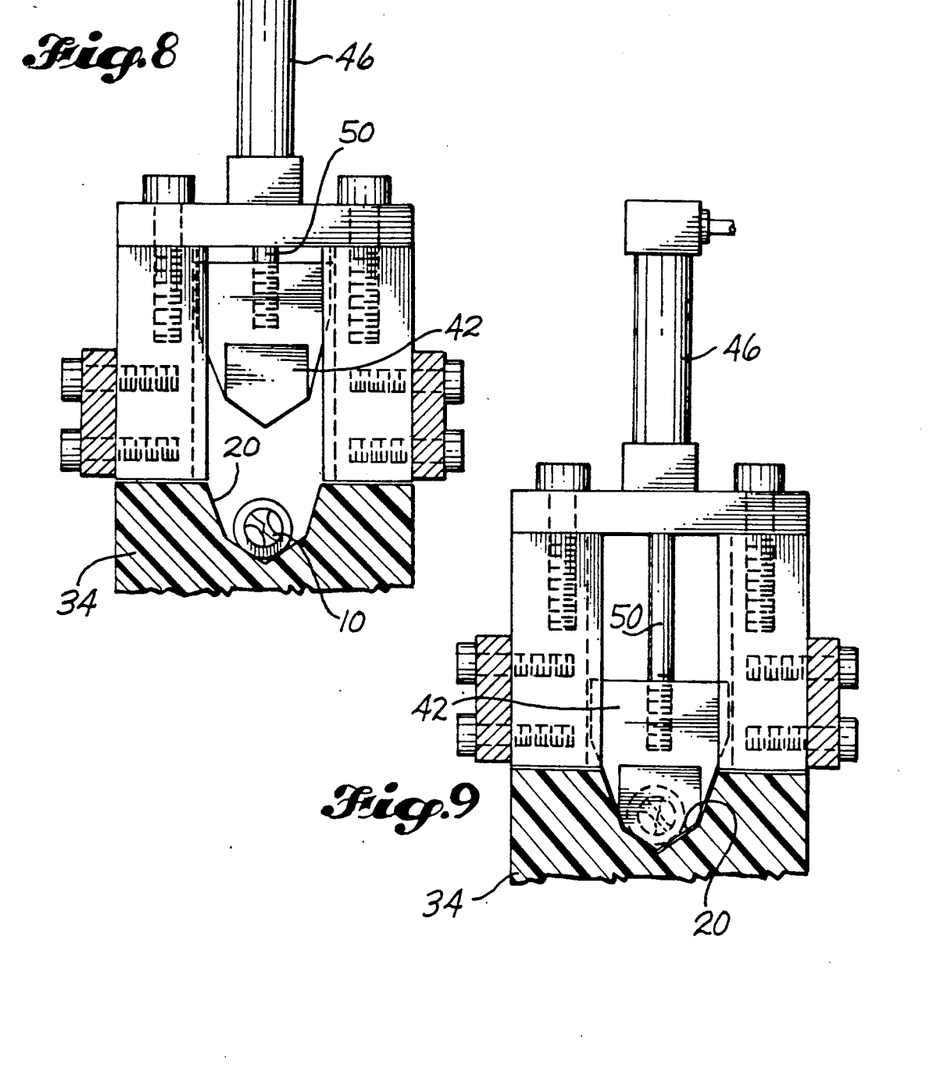
FIG. 8 is an elevational view of gate 42 in a raised position.
FIG. 9 is a view like FIG. 8 but showing gate 42 in a down position.

In preferred form, a stop gate 80 is positioned at the lower end of the conveyor section 120. This gate 80 is normally down and is contacted by an article 10 that is sliding towards it along the slideway channel 126. Gate 80 is essentially identical to the previously described gate 42 and for this reason it will not be described in detail. When the gate 80 is in a "down" position, an article blocking member at the lower end of its piston is within the channel 126 and blocks movement of the article 10. When the gate 80 is in its "up" position the blocking member is elevated to the extent illustrated in FIG. 8, in reference to gate 42, so that an article 10 can slide past the gate 80.

In preferred form, a bounce arrestor 150 is positioned immediately upstream of the gate 80. It comprises a block 152 (FIG. 10) secured to the free end of a pivot arm 154. The opposite end of the pivot arm is secured to a rotary solenoid 156. Block 152 has a flared entrance 158. An article 10 sliding into contact with the gate 80 may tend to bounce upwardly. This is prevented by the block 152. The lower portion of block 152 is formed to include a longitudinal channel which is directed downwardly towards the slideway channel 126. An article 10 is able to slide along the channel 126 below the roof of the channel formed in block 152. The solenoid 156 is provided to rotate the block 152 upwardly so that it will not interfere with the sideways tipping or rotation of the conveyor section 120. A sensor S4 is provided below the downstream end of conveyor section 120. Sensor S4 is secured to and rotates with the conveyor section 120. Sensor S4 senses the presence of an article 10 in position against the gate 80 and sends a signal to the computer "A" informing it of this fact. In response to a signal from sensor S4, indicating that an article 10 is against the gate 80, and a dimension signal from the identification device 84, informing the computer that such article 10 is of a type which needs to be removed from the slide conveyor, the computer "A" commands the solenoid 156 to move upwardly and the fluid cylinder 134 to move in the appropriate direction, for rotating the conveyor section 120 about the axes of pins 122,124, to such an extent that the article 10 will fall sideways out of the channel 126 into one of the collection pans 140,142. The fluid cylinder 134 will then be operated to upright the conveyor section 120 and move the bounce block 152 down into a portion on top of the conveyor section 120.

The system which is illustrated and has just been described is presented by way of example. It is to be understood that the scope of the invention is not to be determined by such example system, but rather by the following claims, interpreted in accordance with the rules of patent claim interpretation, including application of the doctrine of equivalents.

What is claimed is:

1. A downwardly sloping gravity conveyor having opposite sides and comprising, in series:
    a lead-in conveyor section;
    a rotatable conveyor section; and
    a lead-out conveyor section, each said conveyor section including a slideway along which articles slide by gravity, with the slideways of said conveyor sections normally being in linear alignment;
    identification means associated with the lead-in conveyor section, for generating a scanning beam through which each article moves as it moves along the lead-in conveyor section, to determine a characteristic of the article;
    pivots mounting the rotatable conveyor section for rotation about an axis extending longitudinally of the gravity conveyor, for selective rotation towards one side of said conveyor;
    a receiving pan on said one side of the conveyor adjacent the rotatable conveyor section, said receiving pan having a downstream end;
    a collection receptacle at the downstream end of said receiving pan;
    a reversible drive for the rotatable conveyor section;
    a computer means connected to said reversible drive;
    said identification means being connected to the computer means; and
    said computer means functioning in response to a signal from the identification means, indicating an unwanted article or articles, to energize the drive to rotate the rotatable conveyor section about said longitudinal axis to said one side of the conveyor, to in that manner discharge the article or articles sideways from the rotatable conveyor section into the receiving pan, whereby the article or articles will move from the receiving pan into the collection receptacle, said computer means then controlling the drive to return the rotatable conveyor section to said position of linear alignment with the lead-in and lead-out conveyor sections.

2. A downwardly sloping gravity conveyor having opposite sides and comprising, in series:
    a lead-in conveyor section;
    a rotatable conveyor section; and
    a lead-out conveyor section, each said conveyor section including a slideway along which articles slide by gravity, with the slideways of said conveyor sections normally being in linear alignment;
    identification means associated with the lead-in conveyor section, for generating a scanning beam through which each article moves as it moves along the lead-in conveyor section, to determine a characteristic of the article;
    pivots mounting the rotatable conveyor section for sideways rotation about an axis extending longitudinally of the gravity conveyor, said rotatable conveyor section being selectively rotatable about said longitudinal axis to either side of the conveyor;
    a reversible drive for the rotatable conveyor section;
    a computer means connected to said drive;
    said identification means being connected to the computer means; and
    said computer means functioning in response to its receipt of a signal from the identification means indicating an unwanted article or articles, to energize the drive to rotate the rotatable conveyor section about said longitudinal axis to a said side of the conveyor, to in that manner discharge the article or articles sideways from the rotatable conveyor section; and
    a separate receiving pan for articles on each side of the rotatable conveyor section positioned to receive articles discharged from the rotatable conveyor section.

3. A gravity conveyor according to claim 2, wherein each receiving pan slopes longitudinally and has a downstream end, and a collection receptacle positioned at the downstream end for receiving articles deposited into the collection pan.

4. A downwardly sloping gravity conveyor comprising, in series:
    a lead-in conveyor section;
    a rotatable conveyor section; and
    a lead-out conveyor section, each said conveyor section including a slideway along which articles slide by gravity, with the slideways of said conveyor sections normally being in linear alignment;
    identification means associated with the lead-in conveyor section, for generating a scanning beam through which each article moves as it moves along the lead-in conveyor section, to determine a characteristic of the article;
    pivots mounting the rotatable conveyor section for sideways rotation about an axis extending longitudinally of the gravity conveyor;
    a drive for the rotatable conveyor section;
    computer means connected to said drive;
    said identification means being connected to the computer means;
    said computer means functioning in response to its receipt of a signal from the identification means indicating an unwanted article or articles, to energize the drive to rotate the rotatable conveyor section about said longitudinal axis to one side of the conveyor, to in that manner discharge the article or articles sideways from the rotatable conveyor section; and a stop gate at the lower end of the rotatable conveyor section which is movable between a down position in which it blocks sliding movement of articles through the rotatable conveyor section and an up position in which it allows articles to slide past it.

5. A slide conveyor according to claim 4, further comprising an anti-bounce device upstream of the stop gate, comprising a cover member for the slideway positioned over the downstream portion of the slideway in the rotatable conveyor section, and means connected to the slideway cover for moving it upwardly away from the rotatable conveyor section when it becomes necessary to rotate the rotatable section sideways about said longitudinal axis.

* * * * *

UNITED STATES PATENT AND TRADEMARK OFFICE
CERTIFICATE OF CORRECTION

PATENT NO. : 5,048,695

DATED : September 17, 1991

INVENTOR(S) : Robert L. Fuller, Jr. et al

It is certified that error appears in the above-identified patent and that said Letters Patent is hereby corrected as shown below:

On the cover, under "Related U.S. Application Data", after "Ser. No. 270,251, Nov. 10, 1988", delete "abandoned", and insert -- now U.S. Pat. No. 4,940,128, which issued July 10, 1990 --.

Col. 1, line 5, after "1990", insert -- now abandoned, --; and in lines 6 and 7, after "1988", delete "both now abandoned" and insert -- , now U.S. Pat. No. 4,940,128, which issued July 10, 1990 --.

Col. 7, line 5, delete "diameters".

Col. 7, line 21, "ans" should be -- and --.

Col. 8, line 17, "ad" should be -- and --.

Col. 9, line 24, "portion" should be -- position --.

Signed and Sealed this

Eleventh Day of May, 1993

*Attest:*

MICHAEL K. KIRK

*Attesting Officer*     *Acting Commissioner of Patents and Trademarks*